Feb. 9, 1937.　　　　A. J. FIX　　　　2,069,877
NUT CRACKING DEVICE
Filed Jan. 31, 1935
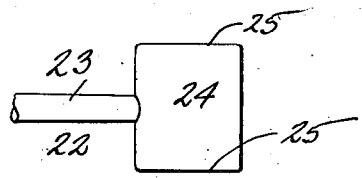
Fig. 1.
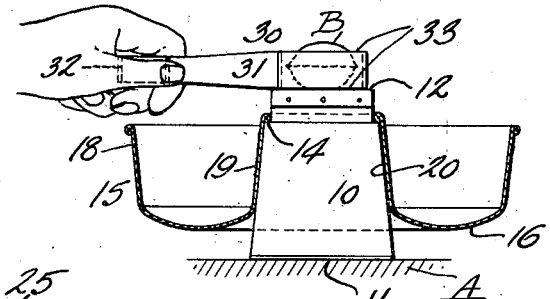
Fig. 2.
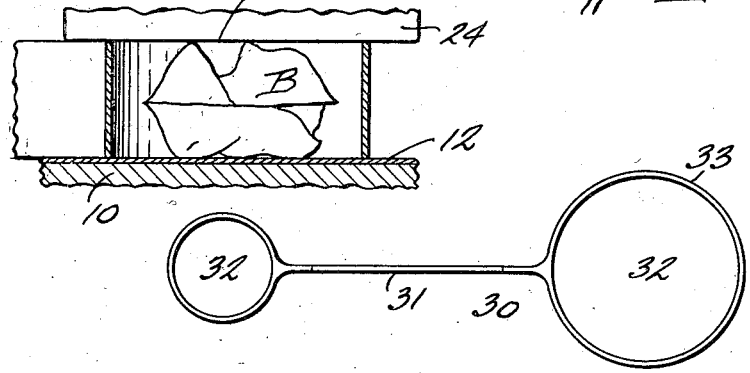
Fig. 3.
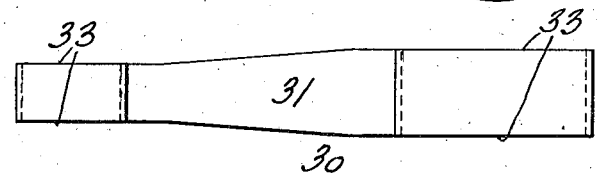
Fig. 4.
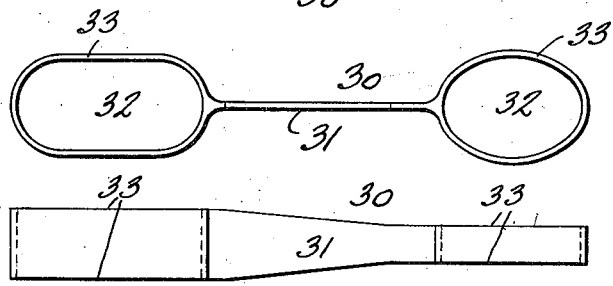
Fig. 5.
Fig. 6.
INVENTOR.
Arthur J. Fix
by Parker, Carnahan & Harmer
ATTORNEYS.

Patented Feb. 9, 1937

2,069,877

UNITED STATES PATENT OFFICE 2,069,877

NUT CRACKING DEVICE

Arthur J. Fix, Buffalo, N. Y.

Application January 31, 1935, Serial No. 4,370

12 Claims. (Cl. 146—14)

This invention relates to devices for facilitating the cracking of nuts, having particular usefulness in cracking the nuts by the impact of a striking implement.

Ordinarily when nuts are placed upon a supporting surface to be cracked in this way by a mallet, hammer, or the like striking implement there is little or no control over the extent to which the nutshells and contents are crushed, so that the meats are often reduced to undesirable fragments, and pieces of shell are scattered in all directions. Moreover in this manner of cracking, the nuts are often held by hand, with frequent bruising of the fingers as a result.

Some objects of this invention are to provide a device for the purpose stated which is of simple and practical construction, is sturdy, durable and inexpensive and by the use of which nuts may be easily and rapidly cracked without the necessity of placing the fingers within range of the striking implement; also to provide a device for this purpose in which a nut can be positioned and loosely retained upon a supporting surface in a manner to permit only a small portion of the nut to protrude therefrom for engagement by the striking implement, and whereby the impact surface of the implement will engage the nut retaining device afer engaging the protruding portion of the nut and cracking the nut to a moderate extent, thereby controlling the extent to which the nut is crushed, so that the meats can be extracted in a substantially whole condition; also to construct the nut retaining device so that it may coact with a striking implement and the nut supporting surface to confine the broken pieces of shell and prevent them from being scattered.

Other objects of the invention are to provide a device for facilitating the cracking of nuts in which a container for the cracked nuts is associated with a block or anvil upon which the nuts are placed to be cracked, and in which the cracked nuts may be deposited by a mere sidewise movement of the nut retaining member, so that the cracking of the nuts can proceed rapidly by alternate actuation of the striking implement and the nut retaining member.

Other objects and advantages of the invention will be apparent from the following disclosure of an embodiment thereof, and the novel features will be pointed out in the appended claims.

In the drawing:

Fig. 1 is a side elevation, partly in vertical section of an embodiment of a device for facilitating the cracking of nuts, constructed in accordance with my invention.

Fig. 2 is a fragmentary vertical section, on an enlarged scale, showing a nut after being cracked, in relation to the nut retaining device, the supporting block, and the striking implement.

Figs. 3 and 4 are respectively, a plan view and a side elevation of a nut retaining device of the invention formed for use with certain kinds and sizes of nuts.

Figs. 5 and 6 are similar views of a nut retaining device for use with other kinds and sizes of nuts.

In the form illustrated in Fig. 1, my device for facilitating the cracking of nuts includes a block or anvil 10 of wood or other desired material and which is of upright form, of circular horizontal section and preferably tapered towards the top. The block 10 has a flat horizontal base 11, which may be covered with felt to enable the device to be used on a table or the like A, without marring the surface thereof. The block 10 also has a horizontal top nut supporting face 12, which, if desired, may have a metal plate mounted upon or secured to the top surface thereof to ensure long wear. Below this plate the block may be formed with a laterally extending horizontal shoulder or abutment 14. A receptacle 15 for the cracked nuts is associated with or is supported upon the block or anvil 10 so that its bottom wall 16 is preferably out of contact with the surface of the table A or other support. The container 15 may be of any suitable form or material, that illustrated being of sheet metal and of substantially circular or annular shape having an outer upright wall 18 and an annular upright wall 19 disposed concentrically within the wall 18. The lower edges of both walls merge or join with the bottom wall 16, so as to thereby provide in the center of the container a substantially cylindrical upright opening or passage 20 which is preferably slightly tapered to fit about a portion of the block 10 below the shoulder 14 thereof. The upper edge of the inner wall 19 may be turned inwardly or beaded to engage upon the shoulder 14. The container 15 is thus supported upon the block 10 and since the wall 19 of the container hugs the side face of the block 10, the container is held against tipping or unintentional displacement in normal use. Nevertheless, the container can be readily removed from the block when desired.

A striking implement 22 in the form of a mallet is shown in Fig. 1, having a handle 23 and a head 24, the latter being provided with at least one impact face 25, which is preferably substantially flat, for engaging and cracking the nuts by blows imparted to the nuts while resting upon the top face 12 of the anvil 10.

There is shown, in use in Fig. 1, a nut retaining member or device 30 by which a nut B is held or confined upon the surface 12 of the block 10 in position for and during the subsequent cracking operation.

This member 30 is preferably manually held and manipulated, being provided with a suitable handle or other grasping portion 31. There is connected to this portion 31, one or more nut retaining eyes or loop elements 32 (two being shown), each composed of an annular wall, the opposite edges 33 of which are substantially parallel and are preferably of straight and smooth or continuous contour.

As seen in Fig. 1, the member 30 is held by hand so that an edge 33 of one of the eyes 30 rests flat upon the top face 12 of the block 10, and loosely disposed within the eye and supported upon the face 12 is a nut B, for example, a walnut. The height of the wall of the eye is such that the selected nut protrudes slightly above the wall or upper edge 33 of the eye.

If now a downward blow of the mallet 22 is struck upon the protruding portion of the nut, the shell thereof will be cracked or crushed. However, the impact or striking surfaces 25 of the mallet are preferably made of larger area than that of the largest eye of the device 30, so that the blow of mallet 22, after cracking the nut sufficiently to displace the protruding portion thereof, will be arrested in its descent by its engagement with the upper edge 33 of the eye.

An approximate result of this action is illustrated in Fig. 2, and it will be seen that the nut is cracked only sufficiently to enable it to be opened, the meat being left in a substantially whole condition, since the mallet is positively arrested and prevented from undesirably crushing the nut by its engagement with the eye of the nut retaining device, as explained.

The wall of the eye 30 is preferably made imperforate, and since the upper and lower sides of the eye are closed respectively by the impact face 25 of the mallet and the top face 12 of the block 10 when the nut is cracked, the latter will be entirely enveloped or confined when the nut opens, thus retaining the meat or kernel and all the pieces of shell within the eye and preventing them from being scattered. The distance between the open faces of each eye is preferably less than the smallest inside dimension of that eye, as shown particularly in the drawing.

A desirable form of the nut retaining member is as shown in the drawing, wherein I form an eye or loop 32 at each end of a relatively straight flat handle or grasping portion 31.

By providing several of these members each with eyes of different diameters and heights of wall, an assortment of eyes is available whereby all the various varieties of nuts can be cracked by selection of a retaining member with an appropriate eye.

The eyes 32 may be substantially circular in outline, as shown in Fig. 3, or more or less elliptical or elongated as in Fig. 5. However, the form of the handle or grasping portion and of the eyes, and the manner of connecting and arranging the eyes relatively to the handle may be considerably varied, if desired.

When using the device, the nuts can be quickly dropped one at a time, alternately with the operation of the mallet, into the eye which is being held upon the anvil and expeditiously cracked in a desirable condition, and as each nut is cracked, the entire nut, consisting of the broken shell and the exposed meat or kernel can be instantly deposited in the container 15 by a mere sidewise shifting of the nut retaining member 30, without otherwise handling the nuts.

While the nut retaining member is preferably provided with some sort of handle or grasping portion, each member may comprise only an eye or loop portion which may be placed upon the block 10, or these nut retaining members, either with or without the handles, may be used without the anvil and the container, by merely placing the eye or member upon any suitable supporting surface.

The device described is of neat and attractive appearance, and if desired, the cracked nuts may be served or eaten from the bowl or container 15 while it is associated with the block or anvil 10, or the container may be lifted and removed from the block and used by itself, and readily emptied at any time.

I claim as my invention:

1. A device for facilitating the cracking of nuts resting upon a supporting surface by the impact of a striking implement, said device including a member having a portion to be grasped in the hand, and nut retaining eyes of different sizes connected thereto and detached from the supporting surface, each eye being open at both faces, of lesser distance between its open faces than the smallest inside dimension of that eye, and both faces of each eye having its largest inside dimension less than a dimension of those faces of the striking implement and supporting surface with which they engage, and each eye having a wall of different height and which is slightly less than the height of the nuts selected to be cracked in that particular nut retaining eye.

2. A device for facilitating the cracking of nuts comprising a nut supporting surface and a striking surface between which a nut is disposed, and a nut retaining member having a nut confining eye interposed between said surfaces and detached therefrom to confine the nut on said supporting surface and which eye is of such height that a portion of the nut protrudes slightly thereabove for engagement by said striking surface, the dimensions of each of said surfaces being greater than that of the smallest internal dimension of the adjacent end of said eye, the movement of the said striking surface towards said supporting surface being arrested by its engagement with said eye, to thereby control the extent to which the nutshell is crushed.

3. A device for facilitating the cracking of nuts comprising a nut supporting surface and a striking surface between which a nut is disposed, a nut retaining member having a nut confining eye interposed between said surfaces to confine the nut on said supporting surface and which eye is of such height that a portion of the nut protrudes slightly thereabove for engagement by said striking surface, the movement of the latter towards said supporting surface being arrested by engagement with said eye to thereby control the extent to which the nutshell is crushed, said supporting surface and said striking surface both having an area greater than that of said eye, and said eye having a substantially imperforate wall, whereby when said striking surface engages said eye, said eye will be closed and fragments of the cracked nutshell will be prevented from scattering.

4. A device for facilitating the cracking of nuts comprising a nut supporting block having a surface upon which a nut may rest, a receptacle for cracked nuts removably associated with said block, with its upper face open and below the level of said surface, a striking implement having an impact surface, and a nut retaining member disconnected from said block and comprising a portion to be grasped in the hand and an eye connected therewith which is engageable upon said nut supporting surface of said block and within which a nut may be confined with a portion of the nut protruding slightly above said eye for engagement by the impact surface of said implement, said surfaces of said supporting block and striking implement being of greater dimensions than the smallest internal dimension of said eye, whereby the descent of said implement will be limited by its engagement with said eye and the extent to which the nutshell is crushed may be controlled, and whereby the cracked nut may be deposited in said receptacle by a sidewise movement of said nut retaining member relatively to said block.

5. A device for facilitating the cracking of nuts comprising an upright block having a surface which forms a nut support, a substantially horizontal, annular abutment on said block, a receptacle of annular dish-like form having a central upwardly projecting hollow part formed to extend about said block and having a part engageable with said block to retain said container in operative relation to said block, a striking implement having an impact surface, and a nut retaining member comprising a portion to be grasped in the hand and an eye connected therewith which is engageable upon said nut supporting surface of said block and within which a nut may be confined with a portion of the nut protruding slightly above said eye for engagement by the impact surface of said implement, whereby the descent of said implement will be limited by its engagement with said eye, and the extent to which the nutshell is crushed may be controlled, and whereby the cracked nut may be deposited in said recepacle by a sidewise movement of said nut retaining member off of said block.

6. A device for faciltating the cracking of nuts including an anvil having a nut supporting surface, and a substantially ring-shaped member detached from said supporting surface, and which may be placed in operative relation thereto to confine a nut on said surface and having a wall of a height slightly less than the height of a nut to be cracked, to limit the descent toward said surface of a striking implement of greater breadth than that of the smallest inside dimension of said member, and to retain fragments of nuts within said member, the breadth of said supporting surface being greater than the internal dimension of said ring-shaped member.

7. A device for facilitating the cracking of nuts and usable in connection with a striking implement and a supporting surface, said device including a ring-shaped wall member open at its top and bottom and of a height slightly less than that of the nut to be cracked, the openings of the top and bottom of said member being smaller than the impact surfaces of said implement and said supporting surface, whereby when said member is positioned on the supporting surface about the nut it will limit the extent to which the striking instrument descends toward said supporting surface, and a handle extending from said member.

8. In a device for cracking the shells of edible nuts by placing a nut on an anvil and striking the same a blow with a striking implement, an improved accessory for use therewith comprising an element having a handle on one part thereof and a loop on another part thereof, said loop being open at both faces and having a depth between said open faces of slightly less than the height of a nut to be cracked, and also an inside diameter less than the diameter of the striking face of said implement, whereby when a nut is confined on said anvil in said loop and struck by said implement, the nut shell may be crushed only until said implement strikes said loop which prevents undue mutilation of the meats of the nut, and the loop then may be used as a scraper to scrape the nut particles from the anvil.

9. In a device for cracking the shells of edible nuts by placing a nut on an anvil and striking the same a blow with a striking implement, an improved accessory for use therewith comprising an element having a handle on one part thereof and a loop on another part thereof, said loop being open at both faces and having a depth between said open faces of slightly less than the height of a nut to be cracked and having its largest inside dimension less than a dimension of the surface of the support and the surface of the striking implement, whereby when a nut is confined on said anvil in said loop and struck by said implement, the nut shell may be crushed only until said implement strikes said loop which prevents undue mutilation of the meats of the nut, and the loop then may be used as a scraper to scrape the nut particles from the anvil.

10. In a device for cracking the shells of edible nuts by placing a nut on an anvil and striking the same a blow with a striking implement, an improved accessory for use therewith comprising an element having a blade-like handle extending from a band-like loop that is open at both faces and with a depth between said faces of slightly less than the height of a nut to be cracked, the largest inside dimension of said loop being less than a dimension of each of the striking surfaces of said anvil and said implement.

11. In a device for cracking the shells of edible nuts by placing a nut on an anvil and striking the same a blow with a striking implement, an improved accessory for use therewith comprising an element having a band-like loop open at both faces and having its smallest inside diameter greater than its depth between said faces, and said depth being slightly less than the height of a nut to be cracked, the largest inside dimension of said loop being less than a dimension of each of the striking surfaces of said anvil and said implement, and a handle extending from said loop, whereby when a nut is confined on said anvil in said loop and struck by said implement, the nut shell may be crushed only until said implement strikes said loop which prevents undue mutilation of the meats of the nut, and the loop then may be used as a scraper to scrape the nut particles from the anvil.

12. A device for facilitating the cracking of nuts by the impact of a striking implement, said device including a striking implement, a member having a portion to be grasped in the hand and a nut retaining eye connected therewith, and a nut supporting surface upon which said eye may be removably positioned to confine the nut within said eye with a portion of the nut protruding slightly out of the eye in position to be struck by said striking implement, the dimension of said surface and of the striking face of said implement being greater than the smallest inside lateral dimension of said eye, whereby the descent of said implement is limited by its engagement with said retaining eye to thereby control the extent to which the nut shell is crushed.

ARTHUR J. FIX.